United States Patent
Chen et al.

(10) Patent No.: US 12,451,716 B2
(45) Date of Patent: Oct. 21, 2025

(54) CONTROL SYSTEM AND METHOD FOR IMPROVING BATTERY OUTPUT ENERGY EFFICIENCY, AND ELECTRONIC DEVICE

(71) Applicant: AUTEL INTELLIGENT TECHNOLOGY CORP., LTD., Guangdong (CN)

(72) Inventors: Huaming Chen, Guangdong (CN); Weikang Wang, Guangdong (CN); Honghua Lu, Guangdong (CN)

(73) Assignee: AUTEL INTELLIGENT TECHNOLOGY CORP., LTD., Shenzhen (CN)

(*) Notice: Subject to any disclaimer, the term of this patent is extended or adjusted under 35 U.S.C. 154(b) by 751 days.

(21) Appl. No.: 17/656,267

(22) Filed: Mar. 24, 2022

(65) Prior Publication Data

US 2022/0216721 A1    Jul. 7, 2022

Related U.S. Application Data

(63) Continuation of application No. PCT/CN2020/118033, filed on Sep. 27, 2020.

(30) Foreign Application Priority Data

Sep. 29, 2019   (CN) .......................... 201910935765.7

(51) Int. Cl.
*H02J 7/00* (2006.01)

(52) U.S. Cl.
CPC .... *H02J 7/007184* (2020.01); *H02J 7/00304* (2020.01); *H02J 2207/20* (2020.01)

(58) Field of Classification Search
CPC ............ H02J 7/007184; H02J 7/00304; H02J 2207/20; H02J 7/0036; H02J 7/0047;
(Continued)

(56) References Cited

U.S. PATENT DOCUMENTS

| | | | |
|---|---|---|---|
| 8,378,626 B2* | 2/2013 | Wang .................... | H02J 7/00 320/140 |
| 9,000,718 B2* | 4/2015 | Park .................. | H02J 7/00302 320/107 |

(Continued)

FOREIGN PATENT DOCUMENTS

| | | | | |
|---|---|---|---|---|
| CN | 101834319 A | | 9/2010 | |
| CN | 102555830 A | * | 7/2012 | .............. B60L 11/18 |

(Continued)

OTHER PUBLICATIONS

First office action of CN patent application No. 201910935765.7 issued on Mar. 22, 2024.
(Continued)

*Primary Examiner* — M Baye Diao
(74) *Attorney, Agent, or Firm* — Andrew C. Cheng

(57) ABSTRACT

A control system and method for improving battery output energy efficiency, and an electronic device are provided. The control system includes: a battery, a charging chip, a voltage conversion module, and a power supply management module. The battery is configured to send, when the control system is not connected to an external power supply, battery voltage to the voltage conversion module by means of the charging chip. The voltage conversion module is configured to receive the battery voltage, determine an operating mode on the basis of the battery voltage, acquire an output voltage corresponding to the operating mode, and output the output voltage to the power supply management module. The power supply management module is configured to convert and output at least one system voltage on the basis of the output voltage, and the at least one system voltage is configured to supply power to a powered system.

19 Claims, 5 Drawing Sheets

(58) Field of Classification Search
CPC ............... H02J 7/0068; H02J 7/007182; H02J 2207/10; B60L 2210/10; B60L 2240/547; B60L 58/10; Y02T 10/70
USPC .......................................................... 320/137
See application file for complete search history.

(56) References Cited

U.S. PATENT DOCUMENTS

| | | | |
|---|---|---|---|
| 9,178,382 B2 * | 11/2015 | Mao | ...................... H02J 7/00711 |
| 9,899,848 B2 * | 2/2018 | Hu | .................... H02J 7/007182 |
| 11,211,813 B2 * | 12/2021 | Tajima | .................. H02J 7/1423 |
| 2015/0042292 A1 | 2/2015 | Mao et al. | |
| 2015/0188325 A1 | 7/2015 | Wagner et al. | |
| 2016/0036266 A1 * | 2/2016 | Mao | ........................ H02J 7/04 320/162 |
| 2017/0040810 A1 | 2/2017 | Hu et al. | |
| 2022/0181900 A1 * | 6/2022 | Chen | ..................... H02J 7/0068 |

FOREIGN PATENT DOCUMENTS

| | | | | |
|---|---|---|---|---|
| CN | 103904698 A | | 7/2014 | |
| CN | 105207316 A | | 12/2015 | |
| CN | 105337374 A | | 2/2016 | |
| CN | 107783580 A | | 3/2018 | |
| CN | 208078681 U | | 11/2018 | |
| CN | 110525266 A | | 12/2019 | |
| CN | 211765057 U | | 10/2020 | |
| EP | 3550694 A1 | * | 10/2019 | .............. B60L 53/62 |
| FR | 2977220 A1 | * | 1/2013 | ................ H02P 3/14 |
| JP | 2006081369 A | | 3/2006 | |
| JP | 2012026742 A | | 2/2012 | |
| JP | 2015133770 A | * | 7/2015 | .............. B60L 58/18 |
| WO | WO2018036238 A1 | | 3/2018 | |

OTHER PUBLICATIONS

Search report of CN patent application No. 201910935765.7 issued on Mar. 22, 2024.
International search report of PCT/CN2020/118033 mailed Jan. 18, 2021 (English translation).
The extended European search for EP 20868700.4, dated Sep. 28, 2022.

* cited by examiner

CONTROL SYSTEM AND METHOD FOR IMPROVING BATTERY OUTPUT ENERGY EFFICIENCY, AND ELECTRONIC DEVICE

CROSS-REFERENCE TO RELATED APPLICATIONS

The present application is continuation application of International Application No. PCT/CN/2020/118033, filed on Sep. 27, 2020, which claims the priority to the Chinese patent application No. 201910935765.7, filed on Sep. 29, 2019, which are incorporated herein by reference in its entirety.

TECHNICAL FIELD

The present application relates to the technical field of batteries, and more particularly to a control system and method for improving battery output energy efficiency, and an electronic device.

BACKGROUND

With the rapid development of the automotive diagnostic technology in recent years, more and more attention is paid to the energy density and output efficiency of lithium batteries. In order to meet the requirements of high power output and long-term endurance, the development of a safe and reliable lithium-ion battery discharging system will make full use of the entire battery capacity, extend the battery life, and improve the customer's comfort experience.

At present, the application scenarios of automotive diagnosis for high power output and long-term endurance are limited by the actual discharging cutoff voltage of a battery, and the discharge capacity of the battery is closely related to environmental changes. For example, the voltage of the automotive diagnostic tablet during the battery power supply is generally 3.5V, and the battery discharging cutoff voltage is generally 3V. When the environment temperature is 25° C. and the battery is discharged to 3.5V when the battery is fully charged, 74% of the battery capacity is discharged; when the environment temperature is −20 degrees, and the battery is discharged to 3.5V when the battery is fully charged, 20% of the battery capacity is discharged. It can be seen that the impact of the environment temperature on the battery discharging capacity will lead to a significant reduction in the battery life and a waste of battery capacity.

SUMMARY

The technical problem to be solved by the present application is to provide a control system and method for improving battery output energy efficiency, and an electronic device, and to solve the technical problems of short battery life and waste of battery capacity.

According to one aspect of an embodiment of the present application, there is provided a control system for improving battery output energy efficiency, the control method being applied to an automotive diagnostic tablet including a powered system. The system includes:

a battery, a charging chip, a voltage conversion module, and a power supply management module, wherein the battery is connected to the charging chip, the charging chip is connected to the voltage conversion module, and the voltage conversion module is connected to the power supply management module;

the battery is configured to send, when the control system is not connected to an external power supply, battery voltage to the voltage conversion module by means of the charging chip;

the voltage conversion module is configured to receive the battery voltage, determine an operating mode on the basis of the battery voltage, acquire an output voltage corresponding to the operating mode, and output the output voltage to the power supply management module;

the power supply management module is configured to output at least one system voltage on the basis of the output voltage, the at least one system voltage being used to supply power to the powered system.

Optionally, the operating mode includes a boost mode and a pass-through mode, and the voltage conversion module is further configured to:

determine whether the battery voltage is greater than or equal to a preset voltage;

if the battery voltage is greater than or equal to the preset voltage, determining that the operating mode is the pass-through mode, and the output voltage corresponding to the pass-through mode is the battery voltage;

if the battery voltage is less than the preset voltage, determine that the operating mode is the boost mode, adjust the magnitude of the battery voltage to the preset voltage, and determine that the output voltage corresponding to the boost mode is adjusted battery voltage.

Optionally, when the control system is connected to an external power supply, the charging chip is configured to charge the battery and outputting a direct current voltage to the voltage conversion module; and the voltage conversion module is configured to receive the direct current voltage and output the direct current voltage to the power supply management module.

Optionally, the voltage conversion module includes a metal oxide semiconductor (MOS) tube, the MOS tube being connected to the charging chip and the power supply management module respectively, wherein the MOS tube is configured to output the battery voltage or the direct current voltage to the power supply management module when the operating mode is the pass-through mode.

Optionally, the voltage conversion module further comprises a boost circuit that connects the charging chip and the power supply management module, wherein the boost circuit is configured to adjust the magnitude of the battery voltage, increase the battery voltage to the preset voltage, and output the adjusted battery voltage to the power supply management module when the operating mode is a boost mode.

Optionally, the voltage conversion module is a DC-DC converter.

Optionally, the DC-DC converter comprises a voltage conversion chip having a VSEL pin for setting voltage thresholds for the boost mode and the pass-through mode.

Optionally, the voltage conversion chip is further provided with a general-purpose input/output (GPIO) pin, a first enable pin, and a second enable pin, wherein the GPIO pin is configured to control the on and off of the DC-DC converter according to a low-level signal and/or a high-level signal input by the first enable pin and the second enable pin, and control the operating mode of the DC-DC converter.

According to another aspect of an embodiment of the present application, there is provided a control method for improving battery output energy efficiency, the control method being applied to an automotive diagnostic tablet including a powered system. The method is executed by the control system for improving battery output energy efficiency as described above, the method including steps of:
    when the control system is not connected to the external power supply, acquiring a battery voltage of the battery by the charging chip;
    determining an operating mode according to the battery voltage, and acquiring an output voltage corresponding to the operating mode by the voltage conversion module; and
    converting and outputting at least one system voltage according to the output voltage, the at least one system voltage being used for supplying power to the powered system by the power supply management module.

Optionally, the operating mode includes a boost mode and a pass-through mode, wherein the step of determining an operating mode according to the battery voltage, and acquiring an output voltage corresponding to the operating mode by the voltage conversion module comprises:
    determining whether the battery voltage is greater than or equal to a preset voltage;
    if the battery voltage is greater than or equal to the preset voltage, determining that the operating mode is the pass-through mode, and the output voltage corresponding to the pass-through mode is the battery voltage;
    if the battery voltage is less than the preset voltage, determining that the operating mode is the boost mode, adjusting the magnitude of the battery voltage to the preset voltage, and determining that the output voltage corresponding to the boost mode is adjusted battery voltage.

In yet another aspect of an embodiment of the present application, there is provided an electronic device comprising the control system for improving battery output energy efficiency as described above.

An embodiment of the present application provides a control system and a control method for improving battery output energy efficiency, the control system being applied to an automotive diagnostic tablet including a powered system. The control system comprises a battery, a charging chip, a voltage conversion module, and a power supply management module, wherein the battery is connected to the charging chip, the charging chip is connected to the voltage conversion module, and the voltage conversion module is connected to the power supply management module. The battery is configured to send, when the control system is not connected to an external power supply, battery voltage to the voltage conversion module by means of the charging chip. The voltage conversion module is configured to receive the battery voltage, determine an operating mode on the basis of the battery voltage, acquire an output voltage corresponding to the operating mode, and deliver the output voltage to the power supply management module. The power supply management module outputs at least one system voltage on the basis of the output voltage, the system voltage supplying power to a powered system. The control system and method for improving battery output energy efficiency provided in the present embodiment can ensure that the voltage input to the power supply management module meets preset requirements, and the voltage is not affected by the environment temperature, thereby making full use of the battery capacity of the battery, ensuring that the voltage delivered by the power supply management module to the powered system can extend the working time of the powered system, and generally improving the endurance time of the device.

BRIEF DESCRIPTION OF THE DRAWINGS

One or more embodiments are illustrated by way of examples with a figure in the corresponding drawings. The illustrative examples are not to be construed as limiting the embodiments. In the drawings, elements having the same reference numeral designations represent like elements, and unless otherwise specified, the drawings are not to scale.

DETAILED DESCRIPTION OF THE DISCLOSURE

In order that the object, technical solution, and advantages of the present application may be more clearly understood, the present application will now be described in further detail with reference to the accompanying drawings and embodiments. It should be understood that the particular embodiments described herein are illustrative only and are not restrictive to the present application.

It should be noted that various features of the embodiments of the present application can be combined with each other without conflict within the scope of the present application. In addition, although the division of functional modules is illustrated in a schematic diagram of an apparatus and a logical order is illustrated in a flowchart, in some cases, the steps illustrated or described may be executed in an order other than shown in the flowchart and a division of modules other than illustrated in the schematic views of the apparatus.

Figure 1:
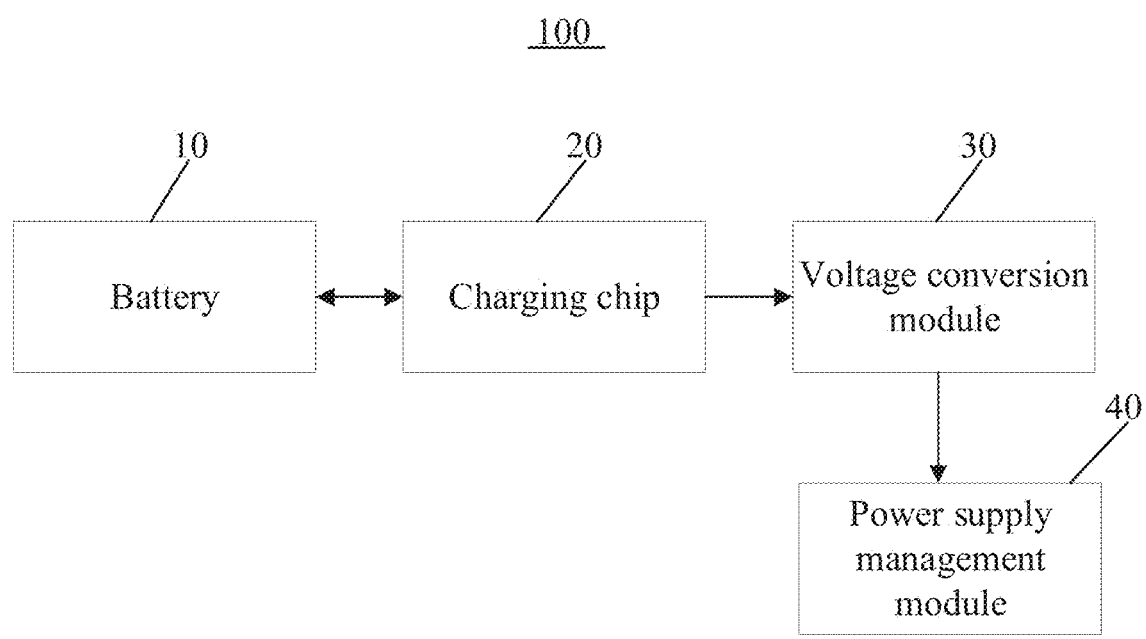
FIG. 1 is a block diagram showing a structure of a control system for improving battery output energy efficiency according to an embodiment of the present application.

FIG. 1 shows a block diagram showing a structure of a control system for improving battery output energy efficiency according to an embodiment of the present application. A control system 100 is applied to an automotive diagnostic tablet including a powered system. The powered system includes an automotive diagnostic tablet system, an micro controller unit (MCU), and other modules requiring a power supply. As shown in FIG. 1, the control system 100 includes a battery 10, a charging chip 20, a voltage conversion module 30, and a power supply management module 40. The battery 10 is connected to the charging chip 20, the charging chip 20 is connected to the voltage conversion module 30, and the voltage conversion module 30 is connected to the power supply management module 40.

In the present embodiment, the control system 100 may or may not have an external power supply, and whether an external power supply is required may be selected according to specific application scenarios. The external power supply may specifically be an adapter, the adapter is connected to the charging chip 20, the adapter provides power for the control system 100, and the communication between the adapter and the charging chip 20 does not involve a communication protocol.

When the control system 100 has an external power supply, the external power supply charges the charging chip 20, and the charging chip 20 charges the battery 10 and supplies power to the system 100. The charging chip 20 outputs a direct current voltage to the voltage conversion module 30, and the voltage conversion module 30 supplies the direct current power to the power supply management module 40, so that the power supply management module 40 converts and outputs at least one system voltage according to the direct current voltage, and the at least one system voltage is used for supplying power to the powered system.

When the control system 100 has no external power supply, the battery 10 supplies a battery voltage to the voltage conversion module 30 via the charging chip 20. The voltage conversion module 30 determines an operating mode according to the battery voltage, acquires an output voltage corresponding to the operating mode, and then supplies the output voltage to the power supply management module 40. The power supply management module 40 converts and outputs at least one system voltage according to the output voltage, and the at least one system voltage is used for supplying power to the powered system.

The operating mode includes a boost mode and a pass-through mode. When the control system 100 has an external power supply, the operating state of the control system 100 is a normal mode, namely, a pass-through mode; when the control system 100 has no external power supply, the operating state of the control system 100 may be the pass-through mode or the boost mode. The voltage conversion module 30 is configured to receive the battery voltage, determine the operating mode according to the battery voltage, and acquire the output voltage corresponding to the operating mode. Specifically, the voltage conversion module 30 determines whether the battery voltage is greater than or equal to a preset voltage; if the battery voltage is greater than or equal to the preset voltage, the voltage conversion module 30 determines that the operating mode is a pass-through mode and the output voltage corresponding to the pass-through mode is the battery voltage; if the battery voltage is less than the preset voltage, the voltage conversion module 30 determines that the operating mode is a boost mode, adjusts the magnitude of the battery voltage to the preset voltage, and determines that the output voltage corresponding to the boost mode is the adjusted battery voltage.

In the present embodiment, the main working principle of the control system 100 is that the battery voltage is delivered to the voltage conversion module 20 via the battery 10, the voltage conversion module 30 determines the operating mode according to the magnitude of the battery voltage, the output voltage is adjusted according to the determined operating mode to meet the voltage requirements suitable for the power supply process of an automotive diagnostic tablet, and the voltage adjusted by the voltage conversion module 30 is delivered to the power supply management module 40, so as to ensure that the power supply management module 40 is in a stable working state, thereby improving the battery capacity utilization rate of the battery 10 and the endurance time of the automotive diagnostic tablet.

Figure 2:
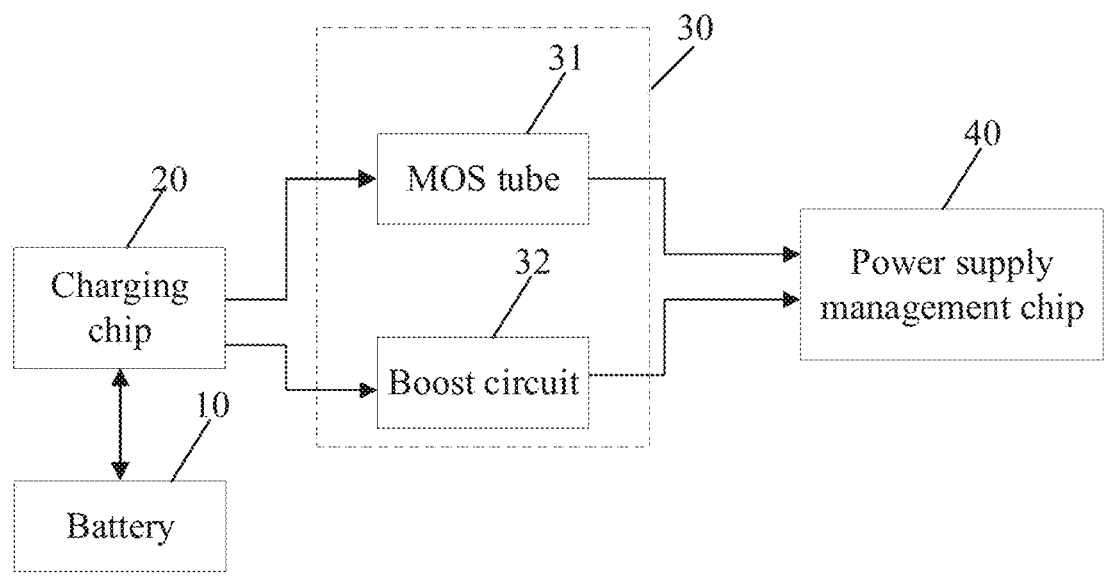
FIG. 2 is a schematic view showing a structure of a control system for improving battery output energy efficiency according to an embodiment of the present application.

FIG. 2 shows a schematic view showing a structure of a control system for improving the battery output energy efficiency according to an embodiment of the present application. Referring to FIG. 1, the voltage conversion module 30 can specifically be a converter 30. As shown in FIG. 2, the control system 100 includes a battery 10, a charging chip 20, a converter 30 including a metal oxide semiconductor (MOS) tube 31 and a boost circuit 32, and a power supply management chip 40. The battery 10 is electrically connected to the charging chip 20, the charging chip 20 is electrically connected to the MOS tube 31 and the booster circuit 32 respectively, and the MOS tube 31 and the boost circuit 32 are electrically connected to the power supply management chip 40.

The battery 10 is a battery device carried by the control system 100 itself, and the battery 10 can specifically be a large-capacity rechargeable lithium battery, etc.

The charging chip 20 can specifically be a lithium battery charging module circuit, and the charging chip 20 can be connected to an external power supply, such as an adapter. The charging chip 20 is configured to receive a charging power supply provided by the external power supply, charge the battery 10 according to the charging power supply, and also supply power to a system module of the control system 100.

The converter 30 can specifically be a direct current (DC)-DC converter that is configured to set an output voltage freely, such as setting a preset voltage as 3.5V, etc. The DC-DC converter is further configured to adjust the magnitude of the battery voltage according to the battery voltage of the battery 10 and the preset voltage, namely, selecting an operating mode, so as to ensure that the voltage output by the DC-DC converter can enable the control system 100 to work stably and effectively. Specifically, the DC-DC converter is configured to determine whether the battery voltage is greater than or equal to a preset voltage; if the battery voltage is greater than or equal to the preset voltage, the DC-DC converter determines that the operating mode is a pass-through mode, and the output voltage corresponding to the pass-through mode is the battery voltage; if the battery voltage is less than the preset voltage, the DC-DC converter determines that the operating mode is a boost mode, adjust the magnitude of the battery voltage to the preset voltage, and determine that the output voltage corresponding to the boost mode is the adjusted battery voltage. The pass-through mode is that the direct current voltage output by the charging chip 20 is directly output to the power supply management chip 40 via the DC-DC converter, and the battery voltage greater than the preset voltage is output to the DC-DC converter via the charging chip 20, and is then output to the power supply management chip 40 via the DC-DC converter; the boost mode is to increase the battery voltage output by the battery 10 to the magnitude of the preset voltage.

In the present embodiment, the converter 30 includes a MOS tube 31 and a boost circuit 32. The MOS tube 31 is connected to the charging chip 20 and the power supply management chip 40, respectively, and the boost circuit 32 is connected to the charging chip 20 and the power supply management chip 40, respectively. When it is determined according to the above-mentioned process that the current operating mode of the converter 30 is a pass-through mode, the direct current voltage or the battery voltage can be output to the power supply management chip 40 via the MOS tube 31; when it is determined according to the above-mentioned process that the current operating mode of the converter 30 is a boost mode, the magnitude of the battery voltage can be adjusted via the boost circuit 32, the battery voltage is boosted to a voltage of the same magnitude as that of the preset voltage, and the voltage is output to the power supply management chip 40. The specific circuit structure of the boost circuit 32 may refer to the prior art.

Figure 3:
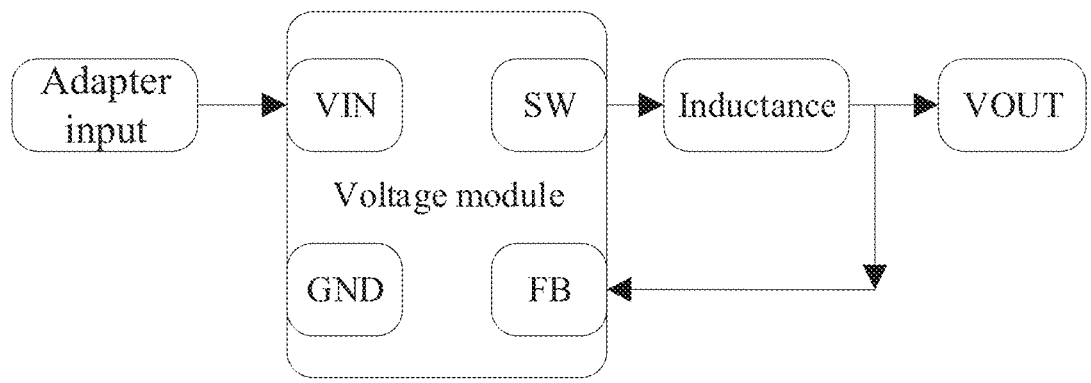
FIG. 3 is a view showing a circuit structure of a voltage module according to an embodiment of the present application.
Figure 4:
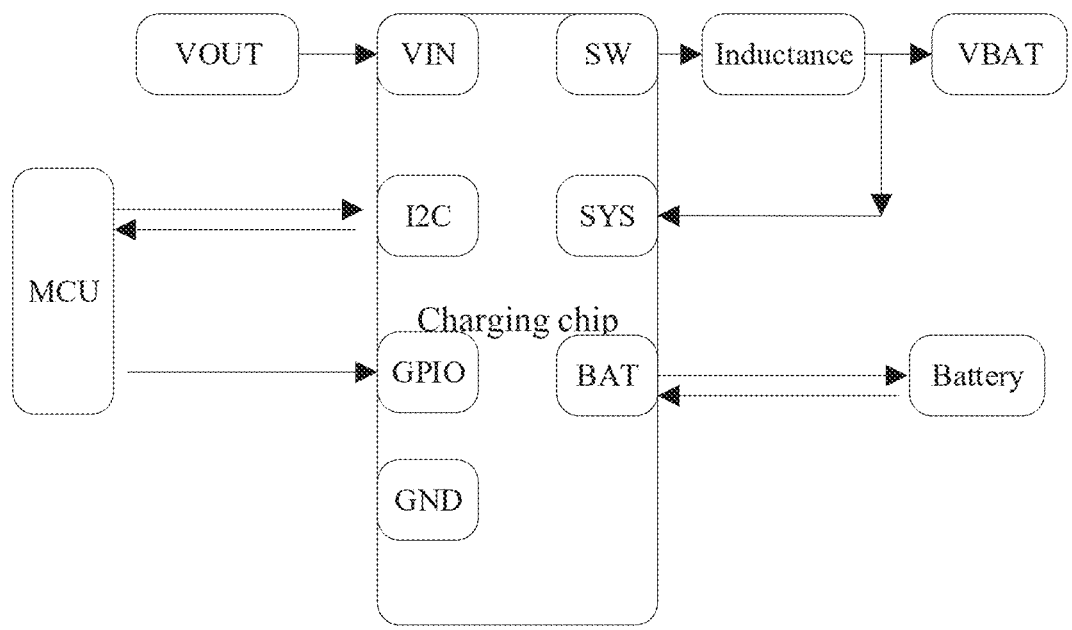
FIG. 4 is a view showing a circuit structure of a charging chip according to an embodiment of the present application.
Figure 5:
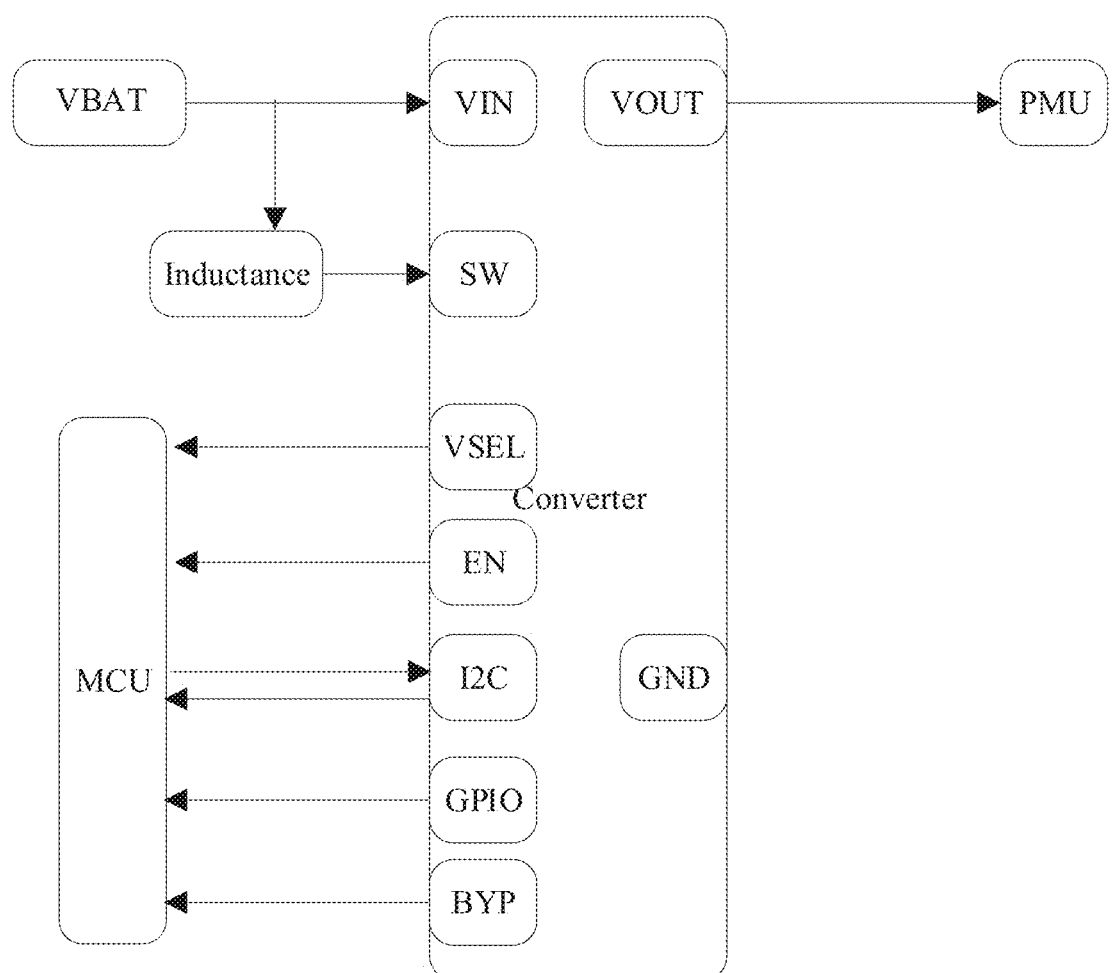
FIG. 5 is a view showing a circuit structure of a converter according to an embodiment of the present application.

Referring to FIGS. 3 to 5, specific circuit diagrams corresponding to the control system 100 are provided. FIG. 3 is a view showing a circuit structure of a voltage module, FIG. 4 is a view showing a circuit structure of a charging chip 20, and FIG. 5 is a view showing a circuit structure of a converter. As shown in FIG. 3, an adapter accesses a voltage (such as 12V) to a voltage module via a VIN, and outputs a processed voltage (such as 8V) from a VOUT after internal processing on a chip. The adapter is used for providing a charging power supply to the voltage module, and the voltage output by the VOUT in FIG. 3 is accessed via a VIN pin in FIG. 4, and the voltage charges a battery 10 via a BAT pin, and supplies power to a system via an SW pin and an SYS pin and is input to the converter in FIG. 5 as an input voltage of the converter. As shown in FIG. 5, the converter shown in FIG. 5 can be a DC-DC converter, which judges the magnitude of the input voltage via an MCU and determines whether the magnitude of the voltage needs to be adjusted. When the magnitude of the voltage does not need to be adjusted, the voltage is delivered to a power supply management chip with the above-mentioned pass-through mode; when the magnitude of the voltage needs to be adjusted, the voltage is delivered to the power supply management chip with the above-mentioned boost mode. As shown in FIG. 5, the converter can be a voltage conversion chip. The voltage conversion chip is provided with a VSEL pin, which is configured to arrange voltage thresholds of the boost mode and the pass-through mode. The voltage conversion chip is further provided with a GPIO pin, a first enable pin, and a second enable pin. The GPIO pin is configured to control the on and off of the DC-DC converter according to a low-level signal and/or a high-level signal input by the first enable pin and the second enable pin, and control the operating mode of the DC-DC converter. For example, the combination mode setting is carried out according to the EN pin and the BYP pin. If EN is 0 and BYP is 0, then the converter is off, and the converter is in a pass-through current limiting mode, and a current of 0.25 A can be output; if EN is 0 and BYP is 1, then the converter is off, and the converter is in a low-voltage output mode, and the output voltage can be VIN−VOUT<=3.6V; if EN is 1 and BYP is 0, then the converter is on, and the converter is in a forced pass-through mode; if EN is 1 and BYP is 1, then the converter is on, and the converter is in an automatic mode, and the boost mode and the pass-through mode can be operated. The converter shown in FIG. 5 comprises an integrated circuit bus (I2C). The I2C bus supports a communication rate of up to 3.4 Mbps, and the I2C bus is configured to provide one communication interface for an MCU to set an output voltage threshold of the converter, and the voltage threshold comprises a voltage thresholds corresponding to a boost mode and a pass-through mode; the operating mode of the converter is set, and comprises PFM/PWM mode or forced PWM mode; the converter inputting overcurrent protection threshold can also be set or the output voltage of the converter can be reset.

The power supply management chip 40 is configured to convert and output various power supply voltages suitable for a powered system, such as 3.3V, 1.8V, 1.2V, 1.0V, etc. according to the voltage input from the converter 30.

According to an embodiment of the present application, a control system 100 for improving the battery output energy efficiency is provided, and the control system 100 is applied to an automotive diagnostic tablet (not shown in FIG. 1). The automotive diagnostic tablet comprises a powered system. The control system 100 comprises a battery 10, a charging chip 20, a voltage conversion module 30, and a power supply management module 40. The battery 10 is connected to the charging chip 20, the charging chip 20 is connected to the voltage conversion module 30, and the voltage conversion module 30 is connected to the power supply management module 40. The battery 10 is configured to send, when the control system 100 is not connected to an external power supply, battery voltage to the voltage conversion module 30 by means of the charging chip 20. The voltage conversion module 30 is configured to receive the battery voltage, determine an operating mode on the basis of the battery voltage, acquire an output voltage corresponding to the operating mode, and deliver the output voltage to the power supply management module 40. The power supply management module 40 outputs at least one system voltage on the basis of the output voltage, the system voltage being used for supplying power to a powered system. The control system 100 provided in this embodiment can ensure that the output voltage input to the power supply management module 40 meets preset requirements. The output voltage is not impacted by high-temperature, low-temperature, and other environments used by the automotive diagnostic tablet, makes full use of the battery capacity, and lowers the cutoff voltage of the battery 10, thereby solving the problems of automotive diagnosis for large power output and short long-duration driving, generally increasing endurance time of a device, and improving the use experience of a user.

Figure 6:
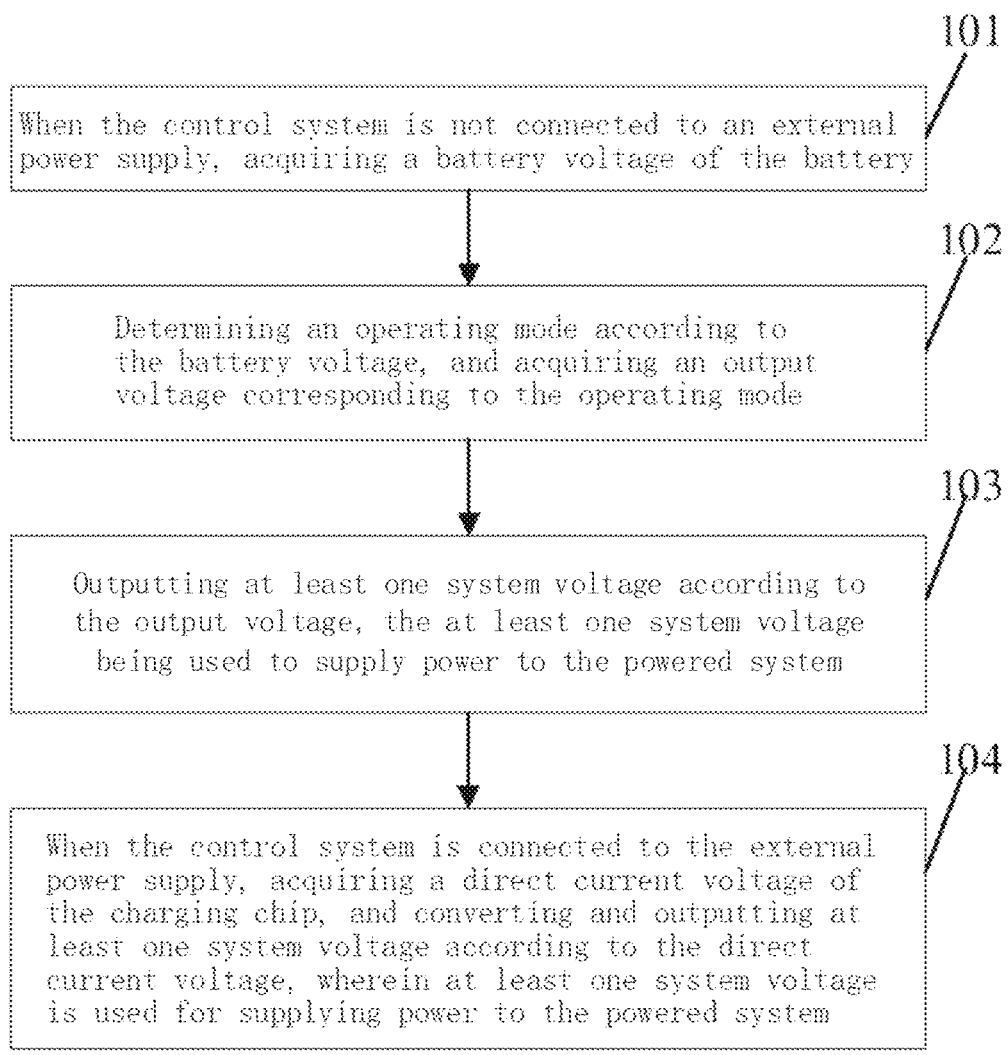
FIG. 6 is a flowchart of a control method for improving battery output energy efficiency according to an embodiment of the present application.

Reference is made to FIG. 6, which is a flowchart of a control method for improving battery output energy efficiency according to an embodiment of the present application. The method is applied to an automotive diagnostic tablet including a powered system, the method being executed by the control system 100 as described above. The method includes:

step 101, when the control system 100 is not connected to an external power supply, acquiring a battery voltage of the battery 10;

step 102, determining an operating mode according to the battery voltage, and acquiring an output voltage corresponding to the operating mode;

step 103, outputting at least one system voltage according to the output voltage, the at least one system voltage being used for supplying power to the powered system;

step 104, when the control system 100 is connected to the external power supply, acquiring a direct current voltage of the charging chip 20, and converting and outputting at least one system voltage according to the direct current voltage, wherein at least one system voltage is used for supplying power to the powered system.

The operating mode comprises a boost mode and a pass-through mode.

In step 102, the step of determining an operating mode according to the battery voltage and acquiring an output voltage corresponding to the operating mode includes:

determining whether the battery voltage is greater than or equal to a preset voltage;

if the battery voltage is greater than or equal to the preset voltage, determining that the operating mode is the pass-through mode, and an output voltage corresponding to the pass-through mode is the battery voltage;

if the battery voltage is less than the preset voltage, determining that the operating mode is the boost mode, adjusting the magnitude of the battery voltage to the preset voltage, and determining that the output voltage corresponding to the boost mode is the adjusted battery voltage.

The above-mentioned steps 101 to 104 are executed by the control system 100 for improving the battery output energy efficiency in the above-mentioned embodiments, and the specific implementation thereof may refer to the above-mentioned embodiments of the control system 100, which will not be described in detail herein.

An embodiment of the present application provides a control method for improving battery output energy efficiency, the control method being applied to an automotive diagnostic tablet including a powered system. The control method includes: when the control system 100 is not connected to an external power supply, acquiring a battery voltage of the battery 10; determining an operating mode according to the battery voltage, and acquiring an output voltage corresponding to the operating mode; and outputting at least one system voltage according to the output voltage, the at least one system voltage being used for supplying power to the powered system. The control method provided in this embodiment can ensure that the output voltage meets preset requirements. The output voltage is not impacted by high-temperature, low-temperature, and other environments used by the automotive diagnostic tablet, makes full use of the battery capacity of the power supply module, and lowers the cutoff voltage of the battery 10, thereby solving the problems of automotive diagnosis for large power output and short long-duration driving, generally increasing endurance time of a device, and improving the use experience of a user.

Embodiments of the present application further provide an electronic device comprising the control system 100 for improving the battery output energy efficiency as described in the above embodiments. The electronic device may specifically be an automotive diagnostic tablet, and also be other devices with the battery 10, such as a diagnostic unit, a TPMS diagnostic tool, an endoscopic diagnostic tool, an anti-theft product detection tool, a battery detection tool, an infrared thermal imaging detection tool, a four-wheel aligner detection tool, etc. The electronic device has the same advantageous effects as that of the system embodiment and the method embodiment mentioned above, and reference may be made in detail to the above-mentioned embodiments with regard to those which are not described in detail in this embodiment.

The above-mentioned apparatus embodiments are merely schematic, wherein the units illustrated as separate parts may or may not be physically separated, and the parts shown as units may or may not be physical units, i. e. may be located in one place, or may also be distributed over multiple network units. Some or all of modules may be selected to achieve the object of the embodiments and solutions according to actual needs.

From the above description of the implementation mode, it will be clear to a person skilled in the art that the implementation modes can be implemented by means of software plus a general-purpose hardware platform, and can of course also be implemented by means of hardware. It will be appreciated by those of ordinary skill in the art that the implementation of all or part of the flow of the methods of the above embodiments may be accomplished by a computer program instructing related hardware. The program can be stored on a computer-readable storage medium. The program, when executed, can include the flow of the embodiments of various methods mentioned above. The storage medium may be a magnetic disk, an optical disk, a Read-Only Memory (ROM), or a Random Access Memory (RAM), etc.

Finally, it should be noted that: the above embodiments are merely illustrative of the technical solutions of the present application, rather than limiting thereto; combinations of technical features in the above embodiments or in different embodiments are also possible within the idea of the present application, and the steps can be implemented in any order, and there are many other variations of the different aspects of the present application as described above, which are not provided in detail for the sake of brevity; although the present application has been described in detail with reference to the foregoing embodiments, those of ordinary skills in the art will appreciate that: the technical solutions disclosed in the above-mentioned embodiments can still be modified, or some of the technical features can be replaced by equivalents; such modifications and substitutions do not depart the essence of corresponding technical solutions from the scope of the technical solutions of various embodiments of the present application.

The invention claimed is:

1. A control system for improving battery output energy efficiency, applied to an automotive diagnostic tablet comprising a powered system, the control system comprising a battery, a charging chip, a voltage conversion module, and a power supply management module, wherein:
   the battery is connected to the charging chip, the charging chip is connected to the voltage conversion module, and the voltage conversion module is connected to the power supply management module;
   the battery is configured to send, when the control system is not connected to an external power supply, battery voltage to the voltage conversion module by means of the charging chip;
   the voltage conversion module is configured to receive the battery voltage, determine an operating mode on the basis of the battery voltage, acquire an output voltage corresponding to the operating mode, and output the output voltage to the power supply management module; and
   the power supply management module is configured to output at least one system voltage on the basis of the output voltage, the at least one system voltage being used to supply power to the powered system.

2. The control system according to claim 1, wherein the operating mode comprises a boost mode and a pass-through mode, and the voltage conversion module is further configured to:
   determine whether the battery voltage is greater than or equal to a preset voltage;
   if the battery voltage is greater than or equal to the preset voltage, determine that the operating mode is the pass-through mode, and the output voltage corresponding to the pass-through mode is the battery voltage;
   if the battery voltage is less than the preset voltage, determine that the operating mode is the boost mode, adjust a magnitude of the battery voltage to the preset voltage, and determine that the output voltage corresponding to the boost mode is adjusted battery voltage.

3. The control system according to claim 2, wherein when the control system is connected to the external power supply, the charging chip is configured to charge the battery and outputting a direct current voltage to the voltage conversion module; and
   the voltage conversion module is configured to receive the direct current voltage and output the direct current voltage to the power supply management module.

4. The control system according to claim 3, wherein the voltage conversion module comprises a metal oxide semiconductor (MOS) tube, the MOS tube being connected to the charging chip and the power supply management module respectively;
   the MOS tube is configured to output the battery voltage or the direct current voltage to the power supply management module when the operating mode is the pass-through mode.

5. The control system according to claim 1, wherein the voltage conversion module further comprises a boost circuit that connects the charging chip and the power supply management module, wherein the boost circuit is configured to adjust the magnitude of the battery voltage, increase the battery voltage to the preset voltage, and output the adjusted battery voltage to the power supply management module when the operating mode is the boost mode.

6. The control system according to claim 1, wherein the voltage conversion module is a DC-DC converter.

7. The control system according to claim 6, wherein the DC-DC converter comprises a voltage conversion chip having a VSEL pin for setting voltage thresholds for the boost mode and the pass-through mode.

8. The control system according to claim 7, wherein the voltage conversion chip is further provided with a general-purpose input/output (GPIO) pin, a first enable pin, and a second enable pin, wherein the GPIO pin is configured to control on and off of the DC-DC converter according to a low-level signal and/or a high-level signal input by the first enable pin and the second enable pin, and control the operating mode of the DC-DC converter.

9. A control method for improving battery output energy efficiency, applied to an automotive diagnostic tablet comprising a powered system, wherein the method is executed by the control system applied to an automotive diagnostic tablet, the automotive diagnostic tablet comprising a powered system, the control system comprising a battery, a charging chip, a voltage conversion module, and a power supply management module, wherein the battery is connected to the charging chip, the charging chip is connected to the voltage conversion module, and the voltage conversion module is connected to the power supply management module, the method comprising steps of:
when the control system is not connected to the external power supply, acquiring a battery voltage of the battery by the charging chip;
determining an operating mode according to the battery voltage and acquiring an output voltage corresponding to the operating mode by the voltage conversion module; and
outputting at least one system voltage according to the output voltage by the power supply management module, the at least one system voltage being used for supplying power to the powered system.

10. The method according to claim 9, wherein the operating mode comprises a boost mode and a pass-through mode, wherein the step of determining an operating mode according to the battery voltage and acquiring an output voltage corresponding to the operating mode by the voltage conversion module, comprises:
determining whether the battery voltage is greater than or equal to a preset voltage;
if the battery voltage is greater than or equal to the preset voltage, determining that the operating mode is the pass-through mode, and the output voltage corresponding to the pass-through mode is the battery voltage;
if the battery voltage is less than the preset voltage, determining that the operating mode is the boost mode, adjusting a magnitude of the battery voltage to the preset voltage, and determining that the output voltage corresponding to the boost mode is adjusted battery voltage.

11. The method according to claim 9, further comprising:
when the control system is connected to the external power supply, acquiring a direct current voltage of the charging chip, and outputting at least one system voltage according to the direct current voltage.

12. An electronic device, comprising a control system for improving battery output energy efficiency, the control system comprising a battery, a charging chip, a voltage conversion module, and a power supply management module, wherein:
the battery is connected to the charging chip, the charging chip is connected to the voltage conversion module, and the voltage conversion module is connected to the power supply management module;
the battery is configured to send, when the control system is not connected to an external power supply, battery voltage to the voltage conversion module by means of the charging chip;
the voltage conversion module is configured to receive the battery voltage, determine an operating mode on the basis of the battery voltage, acquire an output voltage corresponding to the operating mode, and output the output voltage to the power supply management module; and
the power supply management module is configured to output at least one system voltage on the basis of the output voltage, the at least one system voltage being used to supply power to the powered system.

13. The electronic device according to claim 12, wherein the operating mode comprises a boost mode and a pass-through mode, and the voltage conversion module is further configured to:
determine whether the battery voltage is greater than or equal to a preset voltage;
if the battery voltage is greater than or equal to the preset voltage, determine that the operating mode is the pass-through mode, and the output voltage corresponding to the pass-through mode is the battery voltage;
if the battery voltage is less than the preset voltage, determine that the operating mode is the boost mode, adjust a magnitude of the battery voltage to the preset voltage, and determine that the output voltage corresponding to the boost mode is adjusted battery voltage.

14. The electronic device according to claim 13, wherein when the control system is connected to the external power supply, the charging chip is configured to charge the battery and outputting a direct current voltage to the voltage conversion module; and
the voltage conversion module is configured to receive the direct current voltage and output the direct current voltage to the power supply management module.

15. The electronic device according to claim 14, wherein the voltage conversion module comprises a metal oxide semiconductor (MOS) tube, the MOS tube being connected to the charging chip and the power supply management module respectively;
the MOS tube is configured to output the battery voltage or the direct current voltage to the power supply management module when the operating mode is the pass-through mode.

16. The electronic device according to claim 12, wherein the voltage conversion module further comprises a boost circuit that connects the charging chip and the power supply management module, wherein the boost circuit is configured to adjust the magnitude of the battery voltage, increase the battery voltage to the preset voltage, and output the adjusted battery voltage to the power supply management module when the operating mode is the boost mode.

17. The electronic device according to claim 12, wherein the voltage conversion module is a DC-DC converter.

18. The electronic device according to claim 17, wherein the DC-DC converter comprises a voltage conversion chip having a VSEL pin for setting voltage thresholds for the boost mode and the pass-through mode.

19. The electronic device according to claim 18, wherein the voltage conversion chip is further provided with a GPIO pin, a first enable pin, and a second enable pin, wherein the GPIO pin is configured to control on and off of the DC-DC converter according to a low-level signal and/or a high-level signal input by the first enable pin and the second enable pin, and control the operating mode of the DC-DC converter.

* * * * *